United States Patent [19]

Jackson

[11] Patent Number: 4,529,518
[45] Date of Patent: Jul. 16, 1985

[54] INDUSTRIAL WATER FILTER WITH STATIONARY SCREEN

[75] Inventor: Philip Jackson, Paris, France

[73] Assignee: E. Beaudrey & Cie, Paris, France

[21] Appl. No.: 466,221

[22] Filed: Feb. 14, 1983

[30] Foreign Application Priority Data

Feb. 15, 1982 [FR] France ............................ 82 02416

[51] Int. Cl.³ .................................... B01D 29/04
[52] U.S. Cl. ................... 210/407; 210/422; 210/435; 210/456; 210/497.01; 210/512.1
[58] Field of Search .............. 210/101, 106, 162, 349, 210/437, 512.1, 435, 497.01, 420, 422, 451, 456, 407, 441, 455, 457

[56] References Cited

U.S. PATENT DOCUMENTS

| | | | |
|---|---|---|---|
| 511,798 | 1/1894 | Rankine | 210/420 |
| 2,374,613 | 4/1945 | Muller | 210/451 |
| 3,241,676 | 3/1966 | Neuville et al. | 210/791 |
| 3,363,771 | 1/1968 | Walters | 210/360.2 |
| 3,789,992 | 2/1974 | Treplin et al. | 210/435 |
| 3,875,063 | 4/1975 | Treplin et al. | 210/456 |
| 4,043,919 | 8/1977 | Hutzler | 210/407 |
| 4,094,793 | 6/1978 | Patzig | 210/435 |
| 4,108,778 | 8/1978 | Lambert et al. | 210/323.2 |
| 4,276,171 | 6/1981 | Jackson | 210/437 |
| 4,366,056 | 12/1982 | Jackson | 210/512.1 |

FOREIGN PATENT DOCUMENTS

| | | | |
|---|---|---|---|
| 2225726 | 8/1973 | Fed. Rep. of Germany | |
| 685497 | 6/1930 | France | |
| 20330 | 3/1913 | United Kingdom | 210/420 |
| 1225286 | 3/1971 | United Kingdom | |
| 2055302 | 3/1981 | United Kingdom | |
| 2070956 | 9/1981 | United Kingdom | |

Primary Examiner—Marc L. Caroff
Assistant Examiner—Wanda L. Millard
Attorney, Agent, or Firm—Charles A. Brown; Charles E. Brown

[57] ABSTRACT

Industrial water filter comprising a filter housing comprising a sidewall and opposed endwalls, a radial inlet and an axial outlet. A stationary filter is disposed operatively between the inlet and outlet and generally eccentrically relative to the inlet axis so as to produce a sweeping flow pattern along the screen. The interior space between the screen and housing is divided diametrically along an axial plane of the filter housing into two separate channels each of which runs along the screen to a debris recovery zone diametrically opposite the inlet. At the inlet end the interior space is divided by a streamlined flow divider and at the debris recovery end by a separator member which is either a flat plate or a streamlined member. A stiffening web may be joined to the endwalls across an axial plane of the screen. A partition may divide the interior space perpendicularly to the outlet axis into two compartments.

7 Claims, 2 Drawing Figures dustrial use, and in particular water for cooling plants and equipment such as steam turbine condensers. Such filters are designed to retain both debris and living matter such as shellfish and algae which are capable of proliferating downstream in the associated equipment to the detriment of its operation should the living matter not be eliminated beforehand.

INDUSTRIAL WATER FILTER WITH STATIONARY SCREEN

BACKGROUND OF THE INVENTION

The present invention relates generally to filters commonly used for filtering water for industrial use, and in particular water for cooling plants and equipment such as steam turbine condensers. Such filters are designed to retain both debris and living matter such as shellfish and algae which are capable of proliferating downstream in the associated equipment to the detriment of its operation should the living matter not be eliminated beforehand.

The present invention relates more particularly to such filters which comprise a generally cylindrical housing having a radial inlet and an axial outlet, a stationary screen or strainer disposed in the filter housing and operatively interposed between the inlet and the outlet.

The term "radial inlet" is intended to mean an inlet connected to the sidewall of the filter housing and substantially perpendicular to the axis of the filter housing and the term "axial outlet" is intended to mean an outlet connected to one of the endwalls of the filter housing extending along the axis of the housing or at least parallel to the axis of the housing.

One of the problems posed in the design of filters of this type is how to avoid the clogging of the screen or strainer.

DISCUSSION OF THE PRIOR ART

German patent publication No. 2,225,726 discloses a filter in which a butterfly valve is disposed in the inlet, and for facilitating the location of the butterfly valve it is suggested that the stationary screen in the housing should be eccentric relative to the axis of the inlet. By changing the position of the butterfly valve in the inlet, it is at least theoretically possible to clean the screen when debris tends to build up thereon. But turbulent flow is caused in the corresponding fluid screen which translates into momentary disruption in the flow rate and a not insubstantial disturbance downstream. Further, the cleaning of the screen is effected at will, when the screen is already partially clogged or in the process of becoming clogged.

In my U.S. Pat. No. 4,276,171 there is disclosed a filter which, on the contrary, continuously avoids the build-up of debris and clogging on the filter screen.

This filter is characterized by the combination of the orientation of the inlet and the spiral configuration of the sidewall of the filter housing or, more generally, a gradually decreasing flow pattern from the inlet to the debris recovery zone between the sidewall of the filter housing and the stationary screen. A continuous sweeping or cleaning of the stationary screen is thus insured by the incoming stream whereby the debris or living matter entrained by the incoming stream is prevented from accumulating on the screen. The debris or living matter entrained by the incoming stream is carried to the recovery zone from where it is periodically discharged.

Although this filter has been found to be satisfactory, owing to its efficiency and simple construction, as well as its ability to permanently maintain the nominal flow rate without disruption by any moving components and without a drop in its flow rate, it does have drawbacks due to its asymmetrical configuration. Indeed, it has been found that it is necessary to externally reinforce the filter housing along the spiral sidewall and the endwalls. The ultimate cost of the filter is increased accordingly.

SUMMARY OF THE INVENTION

A general object of the invention is the provision of a filter which avoids this drawback while preserving the advantages of continuous sweeping flow along the screen, while producing other advantages.

According to the invention there is provided an industrial water filter comprising a generally cylindrical filter housing a radial inlet and an axial outlet, a stationary screen disposed in the filter housing operatively between the inlet and outlet and generally eccentrically relative to the axis of the inlet. An interior space is defined between the stationary screen and the filter housing. Means divides the interior space into two separate channels along an axial plane of the filter housing containing the inlet axis. The channels run along the respective sides of the stationary screen between the inlet and a debris recovery zone substantially diametrically opposite the inlet, whereby a continuous sweeping flow pattern is produced along the stationary screen preventing the build-up of debris and living matter entrained by incoming water.

Accordingly, the filter operates as if it was made of two substantially semicylindrical half filters adjoining each other along a common diametrical plane.

The present invention is based on the rather surprising observation at first glance that for the sought after continuous sweeping flow pattern along the screen to avoid clogging it was not necessary for the flow pattern to sweep along substantially 360° but, on the contrary, it was possible to obtain satisfactory operation with a sweeping flow pattern restricted to less than 180°.

In fact, since the inlet is radial the incoming stream is divided into two substantially equal branch streams, each flowing along one side, and the branch streams flow around the stationary screen. The branch streams gradually narrow along the stationary screen thereby insuring a uniform velocity distribution and, therefore, a uniform flow along each half of the screen. The branch streams also sweep along the surface of the screen thereby, with undiminished efficiency, preventing the build-up of entrained debris or living matter, which is carried to the associated debris recovery zone.

The construction of the filter housing, which is thus advantageously symmetrical, is simplified. When the sidewall of the filter body is to be of spiral configuration, and taking into account the fact that the sidewall for each half filters covers less than 180°, it is advantageously possible to roughly approximate this by an appropriate eccentricity of the stationary screen in the filter housing. The portion of the sidewall of the corresponding half filter may simply be of semicylindrical configuration comprising a single circular arc, whereas when the contour is a spiral, covering 360°, it is normally necessary to approximate the same by providing three successive circular arcs of different radii.

Of course, if desired, to improve the approximation of the sought-after spiral contour, each of the sidewall portions of the filter housing corresponding to a half filter may comprise at least two successive circular arcs or even a true spiral.

In actual practice, according to the preferred embodiment, the division of the interior space into two separate chambers is provided on the inlet side by a two-vaned streamlined flow divider, the vanes being joined adjacent the inlet and spaced from each other adjacent the screen, each vane being disposed to one side of the axial plane containing the axis of the inlet extending through the filter housing thereby producing a tangential incoming stream. At the opposite or the debris recovery zone side the chambers are divided by a separator member disposed along the said axial plane and comprising a simple plate or a streamlined vaned member like the streamlined flow divider used at the inlet side.

The flow divider and the separator member are, according to a feature of the invention, connected to each other by a diametral partition in the stationary screen, advantageously extending from one endwall to the other. They advantageously comprise reinforcement members for the endwalls so as to eliminate the need for any external reinforcements.

Similarly, if desired, the interior space of the filter housing between the stationary screen and the filter housing may be divided through the axis of the filter housing into at least two separate compartments by an internal partition perpendicular to the axis thereby internally reinforcing the sidewall of the filter housing and contributing to the obtention of a homogeneous distribution for the incoming stream which facilitates the treatment of the incoming stream and the discharge of the debris or living matter from the filter.

Consequently, taking into account the shortness of the flow path in the filter of the invention, which extends along substantially 180°, the efficiency of the periodic discharge of the debris or living matter accumulated in the debris recovery zone is improved.

Finally, since the inlet is radial, the outer dimensions or overall volume of the filter is advantageously reduced, namely as regards the distance between the axis of the stationary screen and the plane of the coupling flange usually provided on the free end of the inlet.

These and other features of the invention will be brought out in the description which follows, by way of example, with reference to the accompanying drawings.

DESCRIPTION OF THE PREFERRED EMBODIMENT

Figure 1:
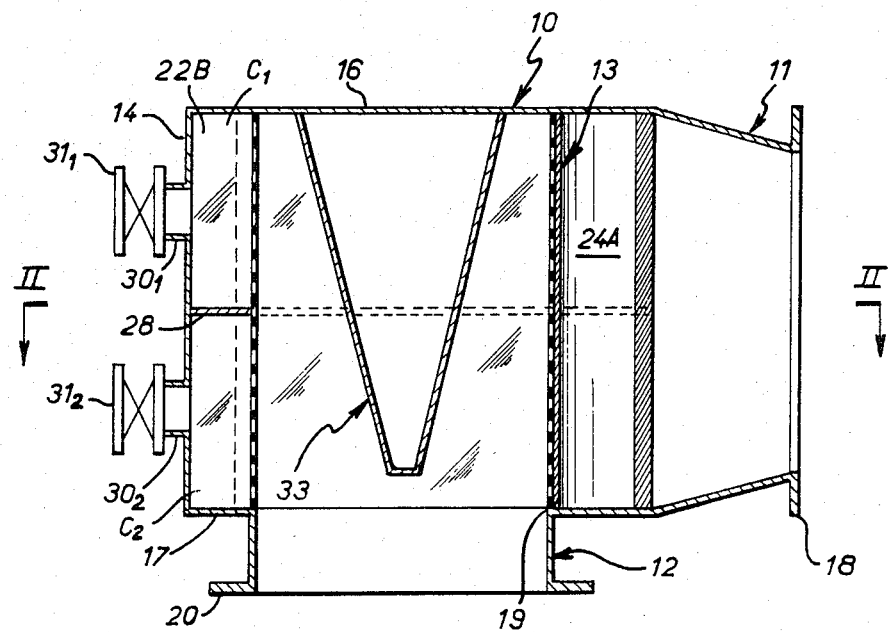
FIG. 1 shows a longitudinal sectional view of a filter embodying the invention, taken along line I—I in FIG. 2.

As shown in the drawings and known per se, the present industrial water filter comprises a generally cylindrical housing 10 having an inlet 11 and an outlet 12, and a stationary screen or strainer 13 which is disposed inside the filter housing 10 and operatively interposed between the inlet 11 and the outlet 12. The filter housing 10 comprises a cylindrical sidewall 14 and two endwalls 16, 17 disposed transversely to the axial ends of the sidewalls 14.

In the drawings, the contour of the cylindrical sidewall 14 of the filter housing 10 is of circular section to simplify the representation.

Figure 2:
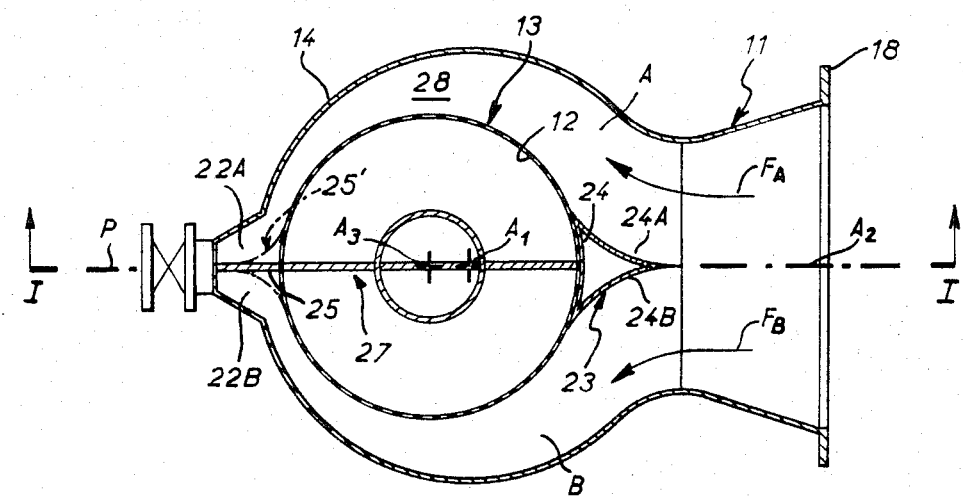
FIG. 2 shows a cross-sectional view taken along line II—II in FIG. 1.

In FIG. 2 the axis of the cylindrical sidewall 14 is marked by a phantom cross A1.

The inlet 11 is radial, in other words it is connected to the sidewall 14 of the filter housing 10 and its axis A2, marked by a phantom cross A2, is perpendicular to axis A1 of the sidewall 14. At the free end of the inlet 11 is a radial coupling flange 18. Preferably, the inlet 11 is of rectangular cross section in its connecting zone with the sidewall 14. The inlet has a circular or polygonal section in line with the coupling flange 18. As is known per se, the inlet 11 is shaped to permit connection between sections of different contours.

The outlet 12 extends from an opening 19 of circular contour in endwall 17 of the filter housing and is axial, i.e., its axis A3 marked by a phantom cross in FIG. 2, is parallel to axis A1 of the sidewall 14 of the filter housing 10.

Like inlet 11, outlet 12 is provided at its free end with a radial coupling flange 20.

Stationary screen 13 is disposed inside filter housing 10 and extends axially from one endwall 16 to the other 17 and outlet 12 is the continuation of the stationary screen 13. The axis of the stationary screen 13 coincides with axis A3 of the outlet 12. In practice, as illustrated, the stationary screen 13 is generally eccentric inside the filter housing 10. The axis A3 of the stationary screen 13 is located farther from the inlet 11 than the axis A1 of the cylindrical sidewall 14 of the filter housing 10.

According to the invention the interior space of the filter, between the stationary screen 13 and the filter housing 10, is diametrically divided into two separate chambers A, B, along the diametral plane P of the housing 10 containing the axis A2 of the inlet. The diametral plane P is schematically shown by a phantom line in FIG. 2 and coincides with that of the axis A2 of the inlet 11. The channels A, B are disposed on the respective sides of the stationary screen 13, and extended from the inlet 11 to the associated debris recovery zone 22A, 22B diametrically opposite the inlet 11.

In the illustrated embodiment the debris recovery zones 22A, 22B protrude from the sidewall 14 of the filter housing 10 extend along the entire height of the sidewall 14, and have an overall trapezoidal cross-sectional configuration.

In practice, at the inlet end the interior space of the filter is divided into the two channels A, B by a streamlined flow divider 23 comprising two vanes 24A, 24B which are joined at their end adjacent the inlet, preferably tangent to each other as shown, and are spaced apart at the other end, adjacent the stationary screen 13, to respective sides of the axial plane P.

In the illustrated embodiment, on the screen side the vanes 24A, 24B of the flow divider 23 are joined to each other by a panel 24 contiguous with the adjacent portion of the screen 13, whereby the cross-section of the flow divider 23 is generally a curvilinear triangle. The junction zone of the inlet 11 with the sidewall 14 of the filter housing 10 has a configuration complementary to that of the vanes 24A, 24B.

The division of the interior space into two separate channels A, B at the side remote from the inlet is effected by a separator member lying along the axial plane of the filter housing 10. In the illustrated embodiment, as shown in solid lines in FIG. 2, the separator member is a mere plate member 25 which extends diametrically to the end of the debris recovery zones 22A, 22B.

Preferably, a stiffening web 27 extends diametrically across the stationary filter 13 from the flow divided 23 to the separator member 25.

In any event, the flow divider 23 and the separator member 25 extend axially from one endwall 16 to the other 17 of the filter housing 10.

Moreover, in the illustrated embodiment the interior space of the filter between the stationary screen 13 and the filter housing 10 is divided into two compartments C1, C2 by an interior partition 28 extending perpendicularly to axis A1 of the filter housing 10. In each compartment C1, C2 a discharge conduit $30_1$, $30_2$ controlled by a valve $31_1$, $31_2$ is provided for each of the debris recovery zones 22A, 22B discharging the accumulated debris or living matter.

A frustoconical deflector 33 is disposed axially inside the stationary screen 13, the frustoconical deflector 33 tapering toward the outlet 12. At its end opposite the outlet 12 the frustoconical deflector 33 has a cross section less than that of the stationary screen 13.

The constructional expedients of the filter thus constructed and schematically illustrated in the drawings are a matter for those skilled in the art and need not be described in detail herein. The actual construction is in any event simplified by the symmetrical configuration of the filter.

As illustrated by arrows $F_A$, $F_B$ in FIG. 2, the incoming stream is divided into two equal half streams on the respective sides of the axial plane of the filter. Each of the half streams sweeps along the corresponding semicylindrical surface of the stationary screen and through the perforation therein so that the various debris and living matter entrained is prevented from building up on the stationary screen and accumulates in the corresponding debris recovery zones 22A, 22B which are periodically evacuated by means of the discharge conduits $30_1$, $30_2$.

It will be understood that the present invention is not intended to be limited to the illustrated and described embodiment by encompasses all modifications and alternatives understood to those skilled in the art without departing from the spirit and scope of the appended claims.

For example the debris recovery zones may form a single debris recovery zone. Also, the number of interior partitions is unimportant; the shape of the deflector 33 and the configuration of the flow divider are subject to various modifications.

Further, as shown in phantom lines in FIG. 2, the separator member on the side opposite inlet 11 may comprise a streamlined vaned member 25' such as the flow divider 23, comprising two vanes which are joined at their end remote from the inlet and spaced apart at their end closer to the inlet, to the respective sides of the axial plane of the filter housing including the axis of the inlet.

Generally speaking, the arrangement of the overall filter into two parts symmetrical with respect to a plane, which is advantageously defined by the stiffening web 27 considerably facilitates the construction, especially for large size units.

Furthermore, and it will be understood, the present filter is advantageously entirely static, with no moving parts necessary for effecting the unclogging of the structure. Clogging is prevented in operation by the sweeping flow pattern with the threefold advantages brought out in my U.S. Pat. No. 4,276,171 and discussed hereinabove.

What is claimed is:

1. An industrial water filter of the type comprising a generally cylindrical filter housing having a radial inlet and an axial outlet, a stationary screen disposed in said filter housing operatively between said inlet and outlet and generally eccentrically along the axis of said inlet, an interior space being defined between said stationary screen and said filter housing, means dividing, into two separate channels, said interior space diametrically along an axial plane of said filter housing containing said inlet axis, each of said channels running along respective sides of said stationary screen between said inlet and a debris recovery zone substantially diametrically opposite said inlet, whereby a continuous sweeping flow pattern is formed in each of the channels along said screen preventing the build-up of debris and living matter entrained by incoming water, said means dividing said interior space comprising a flow divider comprising two vanes joined at their end adjacent said inlet and spaced to respective sides of said axial plane at their end adjacent said stationary screen, said vanes extending the full height of said stationary screen for directing flow of incoming water against and about said stationary screen, said ends of said vanes being directly adjacent said stationary screen.

2. The filter of claim 1, wherein said means dividing said interior space further comprises a separator member disposed along said axial plane, remote from said inlet.

3. The filter of claim 2, wherein said filter housing comprises a sidewall and two endwalls, said separator member extending from one endwall to the other.

4. The filter of claim 2, wherein said separator member comprises a simple plate.

5. An industrial water filter of the type comprising a generally cylindrical filter housing having a radial inlet and an axial outlet, a stationary screen disposed in said filter housing operatively between said inlet and outlet and generally eccentrically along the axis of said inlet, an interior space being defined between said stationary screen and said filter housing, means dividing, into two separate channels, said interior space diametrically along an axial plane of said filter housing containing said inlet axis, each of said channel running along respective sides of said stationary screen betwen said inlet and a debris recovery zone substantially diametrically opposite said inlet, whereby a continuous sweeping flow pattern is formed in each of the channels along said screen preventing the build-up of debris and living matter entrained by incoming water, said means dividing said interior space comprising a separator member disposed between said filter housing and said stationary screen along said axial plane, remote from said inlet, said separator member extending completely between said filter housing and said stationary screen.

6. The filter of claim 5, wherein a web extends along said axial plane from said flow divider to said separator member dividing the interior of said stationary of said stationary screen in two.

7. An industrial water filter of the type comprising a generally cylindrical filter housing having a radial inlet and an axial outlet, a stationary screen disposed in said filter housing operatively between said inlet and outlet and generally eccentrically along the axis of said inlet, an interior space being defined between said stationary screen and said filter housing, means dividing, into two separate channels, said interior space diametrically along an axial plane of said filter housing containing said inlet axis, each of said channels running along respective sides of said stationary screen between said inlet and debris recovery zone substantially diametrically opposite said inlet, whereby a continuous sweeping flow pattern is formed in each of the channels along said screen preventing the build-up of debris and living matter entrained by incoming water, said means dividing said interior space comprising a flow divider comprising two vanes joined at their end adjacent said inlet and spaced to respective sides of said axial plane at their end adjacent said stationary screen, said means dividing said interior space further comprising a separator member disposed along said axial plane, remote from said inlet, said separator member comprising a streamlined vaned member including two vanes which are joined at their end remote from said inlet and spaced from each other on opposite sides of said axial plane at their end closer to said inlet.

* * * * *